United States Patent [19]
Witt et al.

[11] Patent Number: 5,437,934
[45] Date of Patent: Aug. 1, 1995

[54] COATED CEMENT BOARD TILES

[75] Inventors: Alvin E. Witt, West Chester; Joseph E. Tomasko; Matthew F. Humphreys, both of Bellefonte, all of Pa.

[73] Assignee: Permagrain Products, Inc., Media, Pa.

[21] Appl. No.: 140,255

[22] Filed: Oct. 21, 1993

[51] Int. Cl.⁶ .............................................. B32B 9/00
[52] U.S. Cl. ................................ 428/537.1; 428/47; 428/50; 428/57; 428/191; 428/337; 428/351; 428/354; 428/445; 52/384; 52/389; 52/539
[58] Field of Search ............... 428/203, 354, 351, 58, 428/53, 537.1, 47, 50, 57, 191, 337, 445; 52/595, 539, 384, 389

[56] References Cited
U.S. PATENT DOCUMENTS

| | | |
|---|---|---|
| 2,165,788 | 7/1939 | Elmendorf . |
| 3,287,203 | 11/1966 | Elmendorf ........................ 161/123 |
| 4,242,390 | 12/1980 | Nemek ............................... 428/47 |
| 4,256,798 | 3/1981 | Witt et al. ......................... 428/215 |
| 4,568,564 | 2/1986 | Witt ................................... 427/44 |
| 5,052,161 | 10/1991 | Whitacre ........................... 52/385 |
| 5,182,892 | 2/1993 | Chase ................................ 52/539 |

Primary Examiner—Patrick J. Ryan
Assistant Examiner—Abraham Bahta
Attorney, Agent, or Firm—Eugene E. Renz, Jr.

[57] ABSTRACT

A floor including a plurality of tiles inter engaging each other by tongue and groove engagement. The tiles include a cement base portion cut to a desired size for a floor tile and being coated with a waterproof coating to substantially maintain the moisture content of the cement at a constant level. The tile also includes a veneer layer on top of the base portion having a combination of wood and vinyl to provide a thin layer having the appearance of wood and a vinyl surface facing up from the layer. In a preferred embodiment the cement base portion includes a pair of parallel sides having tongue and groove cuts along opposite parallel sides to provide interlocking engagement with an adjacent tile. The underside of the groove is angled at an angle sufficient to provide a relief space at the engagement of a groove in an adjacent tile. The veneer layer may comprise a vinyl impregnated porous wood, such as red oak, ash, maple or cherry, or the veneer layer may comprise a wood veneer having a vinyl laminate thereon in an amount sufficient to impregnate the wood veneer.

19 Claims, 2 Drawing Sheets

COATED CEMENT BOARD TILES

FIELD OF THE INVENTION

The present invention relates to an improved floor tile and more particularly to a floor tile utilizing cement and wood in a combination that has ecological and economical advantages.

BACKGROUND OF THE INVENTION

Concern for the environment has become a nearly universal endeavor, as planners, designers, manufacturers, wholesalers and retailers are responding to consumer needs and demands for products which are pleasing to the consumer and which embody improved safety and reduces use of natural resources. It is particularly important in the construction industry that there be a more efficient use of wood and wood products, at least in part because mature trees are being harvested faster than they are being produced. It is also important that substitutes for fully natural wood products be safe and not contain harmful chemical products which have the potential for long term adverse affects on humans. Not only should the products be safe and appealing, it is desirable that they be of lower cost and less difficulty in manufacture.

Elmendorf U.S. Pat. No. 2,165,788 discloses tiles formed from wood blocks while what appears to be a related patent also to Elmendorf, U.S. Pat. No. 3,287,203 suggests that thinner hardboard for hardwood flooring is less likely to incur residual indentation. Vinyl tiles are also disclosed as being softer but having much better resistance to permanent indentation.

Some efforts have been made to provide alternative flooring tiles and the like, using impregnated wood and wood products. Impregnated wood containing products are disclosed in my U.S. Pat. No. 4,568,564 in which a wear-resistant wood product is taught. Similarly, tile products are disclosed in my U.S. Pat. No. 4,519,174, in which composite Masonry-plastic articles are formed into wall and floor structures.

Other prior art proposals for improved flooring include mixtures and combinations of synthetic materials such as vinyl and plastic with natural materials such as wood, asbestos and the like. Vinyl flooring, while having some distinct advantages, does require expensive subfloor requirements. It is not always dimensionally stable and many tiles cannot be installed in below grade conditions. British Patent No. 1,065,053 suggests that cement products may be combined with polymeric materials, particularly polyesters and the like, to provide coatings for flooring items.

None of the known floor tile methods provide a truly modern floor tile in which natural wood beauty is preserved, using ecologically intelligent quantities of wood while at the same time having other important modern features, particularly relating to safety and environmental concerns.

Accordingly, it is an object of the present invention to provide an improved floor tile using efficient quantities of wood.

Another object of this invention is to provide a floor tile which is environmentally safe, such as by the elimination of formaldehyde resins and adhesives.

Yet another object of the present invention is to provide a floor tile having superior slip requirements and flame spread resistance while eliminating expensive subfloor and installation requirements.

Other objects will appear hereinafter.

SUMMARY OF THE INVENTION

It has now been discovered that the above and other objects of the present invention may be accomplished in the following manner. Specifically, the present invention provides a floor tile comprising two parts.

The bottom or base portion of the tile is a cement base portion cut to a desired size for a floor tile. This base portion is coated with a waterproof coating such as a penetrating sealer such as Thompson's Water Seal, or it may be a penetrating epoxy mastic which is also commercially available as a cement sealant. The purpose of the sealer is to substantially maintain the moisture content of the cement at a constant level.

The cement base portion is cut to include a pair of parallel sides having tongue and groove cuts along opposite parallel sides to provide interlocking engagement with an adjacent tile. Of course the other pair of parallel sides are cut straight for side by side engagement with the adjacent tiles. The tiles are designed to be placed on subflooring, even in underground or below grade conditions, with a simple felt mat placed between the subfloor and the base of the tile.

On top of the base portion is a veneer layer having a combination of wood and vinyl to provide a thin layer having the appearance of wood and a vinyl surface facing up from said layer. The veneer layer extends over the entire base. A relief space tinder the tongue of the tile provides relief for uneven subflooring.

In one embodiment, the veneer layer comprises a vinyl impregnated porous wood such as red oak, ash, maple, cherry and the like. Red oak is a preferred porous wood that absorbs large quantities of vinyl to produce a saturated, impregnated veneer of admirable appearance and wear. Alternatively, the veneer layer may be formed from a wood veneer having a vinyl laminate thereon in an amount sufficient to impregnate said wood veneer.

BRIEF DESCRIPTION OF THE DRAWINGS

For a more complete understanding of the invention, reference is hereby made to the drawings, in which.

DETAILED DESCRIPTION OF THE PREFERRED EMBODIMENT

Figure 1:
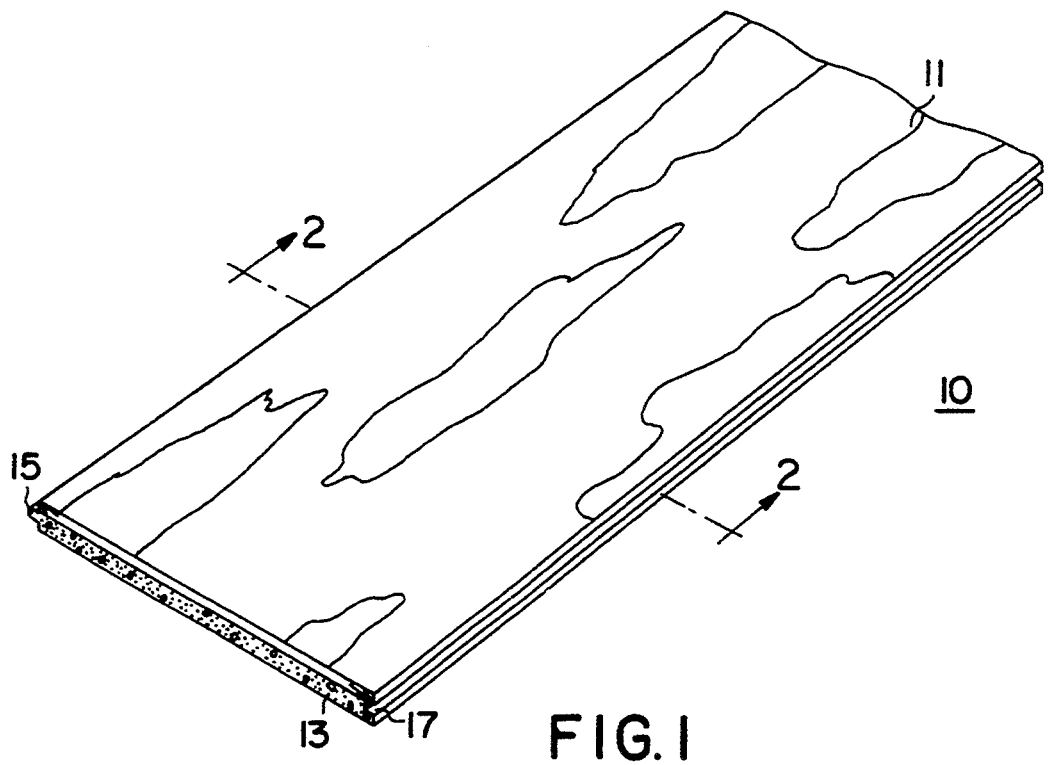
FIG. 1 is a perspective view showing a portion of a flooring strip in accordance with the invention.

As shown in the drawings, a flooring 10 generally comprises a wood outer tile surface 11 which is bonded to a cement base 13. Cement base 13 is formed with tongue 15 and groove 17 cuts so as to permit a plurality of tiles to be joined to form a flooring of improved quality.

Figure 2:
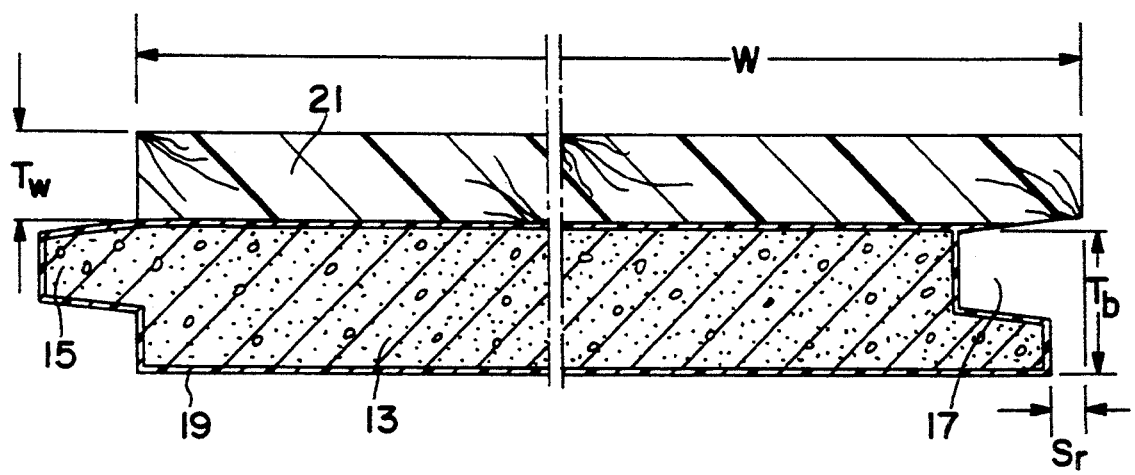
FIG. 2 is an enlarged, sectional elevational view token along the line 2,2 of FIG. 1, with a large portion of continuous detail being broken out of the view in order to show details of construction at a large scale.

In one embodiment shown in FIG. 2, the tile has a cement base 13 into which tongue 15 and groove 17 have been formed. Cement base 13 is coated with a waterproof coating 19, such as Thompson's Water Seal or one of the various penetrating epoxy mastics that are commercially available. All that is necessary is that the waterproof coating 19 maintain the moisture content of the cement 13 so that the cement does not dry out and, in time, begin to deteriorate or crumble. Properly coated cement can last for decades if cared for with routine maintenance.

The base in FIG. 2 has been coated with a Perma-Grain ® floor surface comprising an impregnated layer of wood. Specifically, a red oak wood layer is saturated with vinyl to produce a fully impregnated veneer 21 and epoxied as at 23 to base 13.

The thickness of the groove 17 is, of course, less than the thickness of the cement base 13. Tongue 15 is also formed from the cement 13, and has a tagered underside at angle α as shown.

Figure 3:
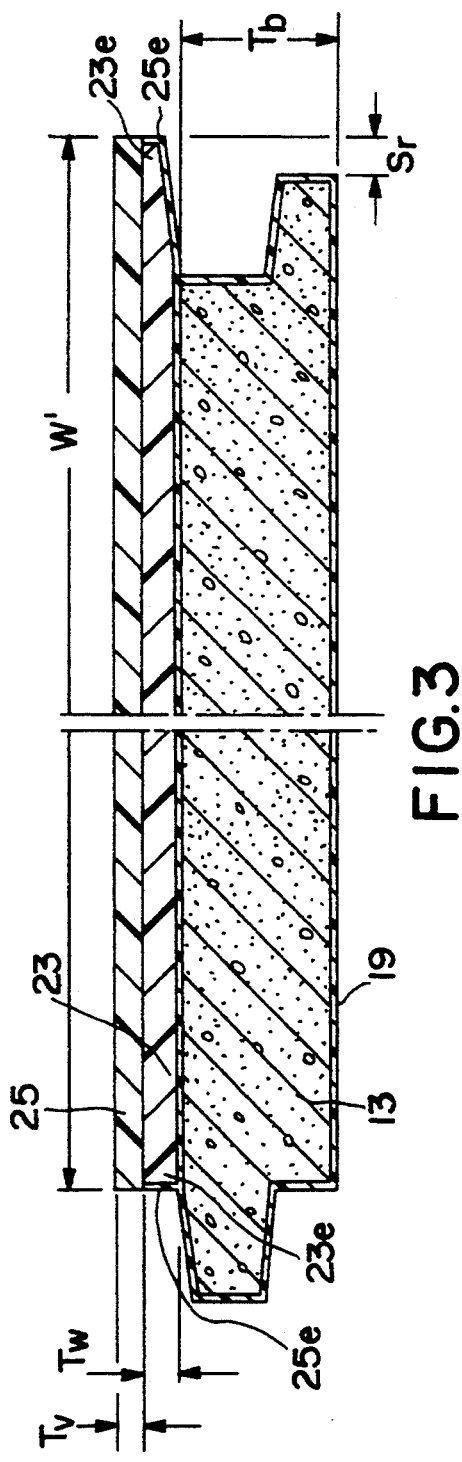
FIG. 3 is a sectional elevational view similar to FIG. 2, showing a different embodiment of the invention.

The alternative embodiment shown in FIG. 3 also includes a cement base 13 coated with a waterproof coating 19. In this embodiment, the base 13 is covered with adjacent layers of vinyl 25a, wood 25b and vinyl 25c, produced for example by the GenuWood ® flooring which provides superior damp mop maintenance. Note that the embodiment of FIG. 3 also has the same tongue 15 and groove 17 arrangement for assembly of a plurality of tiles into a flooring. Also included in the embodiment of FIG. 3 is the inward taper of the underside of tongue 15 at angle α.

Figure 4:
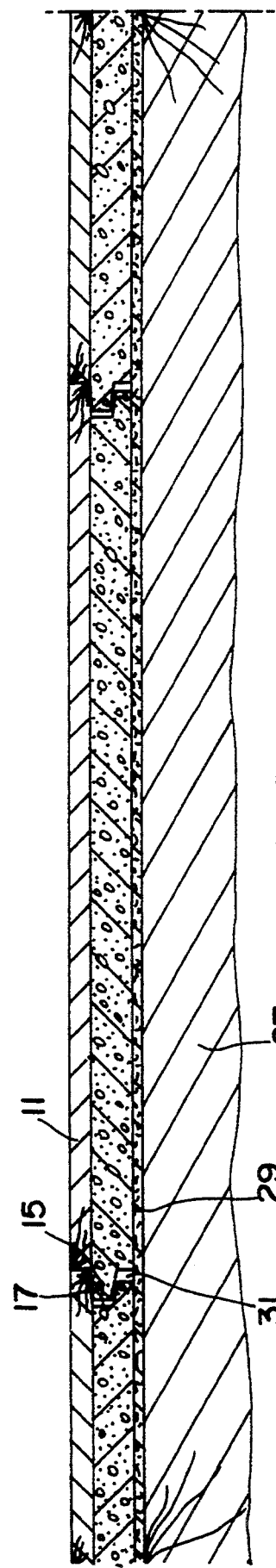
FIG. 4 is a fragmentary sectional elevational view of adjacent and interlocking flooring strips such as shown in FIGS. 1 and 2.

FIG. 4 shows the tiles of the present invention on a subfloor 27. In this embodiment, which takes advantage of the embodiment described above, a felt mat 29 is placed between subfloor 27 and the tile bases 13. Tongue 15 is inserted into groove 17 such that the top layers 21 (or 25a, 25b and 25c vinyl coated wood as shown in FIG. 3) engage end to end, leaving a small space 31 created by the inclined face on the tongue side of each tile or angle α, which is approximately 3° from the verticle to adjust to irregularities and uneven grading. Thus a fully protected flooring is produced using very little wood while retaining the beauty and elegance of wood. Similarly, inexpensive and environmentally safe cement and vinyl eliminate tile need for formaldehyde based adhesives and other potentially hazardous or harmful materials.

The tiles of the present invention are easily made. Fiber reinforced cement board or a similar material is manufactured to a moisture content which provides strength and durability without dryness that can lead to deterioration or crumbling. Both sides of the cement base are coated with a strengthening sealer and as described above. In a similar fashion the veneer is roll coated on both sides with a tough temperature adhesive. This top veneer layer is then attached to the coated side underhead and pressure thereby producing the tile of this invention. The two embodiments described above are each produced in this manner.

In the PermaGrain ® floor surface, dried 1/12 inch thick wood veneer is impregnated with acrylic and any dyes that may be desirable for color control, etc. Other thickness such as ⅛, 1/30 or others can also be used. The acrylic is hardened and edge glue is applied to properly sized sheets. The cement board and the acrylic impregnated veneer are pressed together to form the laminated product of this invention described in FIG. 2.

In the GenuWood ® flooring, 1/45 inch kiln dried veneer is trimmed and spliced to the desired press size, although other thickness are used. A temperature sensitive glue is roll coated on both sides and allowed to dry. Then a laminate of the cement base, sealer and a thin colored vinyl layer, the coated wood veneer, and finally about 20 mils of clear vinyl is formed and pressed as desired. The size and tongue and groove for particular tiles are then cut and the final product is packaged for shipment and ultimate installation.

While particular embodiments of the present invention have been illustrated and described, it is not intended to limit the invention, except as defined by the following claims.

In another embodiment, other surfaces such as wood, vinyl, urethane and the like may be added to the bottom of the base of cement layer 13, particularly to enhance bonding to particular subflooring and the like.

We claim:

1. A floor tile, comprising:
   a cement base portion cut to a desired size for a floor tile, said base portion being coated with a waterproof coating to substantially maintain the moisture content of said cement at a constant level;
   a veneer layer on top of said base portion, said veneer layer having a combination of wood and vinyl to provide a thin layer having the appearance of wood and a vinyl surface facing up from said layer.

2. The tile of claim 1, wherein said cement base portion includes a pair of parallel sides having tongue and groove cuts along opposite parallel sides to provide interlocking engagement with an adjacent tile.

3. The tile of claim 2, wherein said veneer layer extends out over said parallel side having said groove cut by a distance sufficient to provide a relief space at the engagement of an adjacent tile in said groove.

4. The tile of claim 1, wherein said veneer layer comprises a vinyl impregnated porous wood selected from oak, ash, maple or cherry.

5. The tile of claim 4 wherein said porous wood is red oak.

6. The tile of claim I wherein said veneer layer comprises a wood veneer having a vinyl laminate thereon in an amount sufficient to impregnate said wood veneer.

7. The tile of claim 6 which includes vinyl covering of the edges of said wood veneer.

8. A floor including a plurality of tiles inter engaging each other by tongue and groove engagement, said tiles comprising:
   a cement base portion cut to a desired size for a floor tile, said base portion being coated with a waterproof coating to substantially maintain the moisture content of said cement at a constant level;
   a veneer layer on top of said base portion, said veneer layer having a combination of wood and vinyl to provide a thin layer having the appearance of wood and a vinyl surface facing up from said layer.

9. The tile of claim 8, wherein said cement base portion includes a pair of parallel sides having tongue and groove cuts along opposite parallel sides to provide interlocking engagement with an adjacent tile.

10. The tile of claim 9, wherein the end of said base under said tongue is tapered at an angle sufficient to provide a relief space at tile engagement of a groove in an adjacent tile.

11. The tile of claim 8 wherein said veneer layer comprises a vinyl impregnated porous wood.

12. The tile of claim 11 wherein said porous wood is red oak.

13. The tile of claim 8 wherein said veneer layer comprises a wood veneer having a vinyl laminate thereon in an amount sufficient to impregnate said wood veneer.

14. The tile of claim 13 which includes vinyl covering of the edges of said wood veneer.

15. A method of forming a floor tile, comprising the steps of:

forming a cement base portion cut to a desired size for a floor tile, said base portion being coated with a waterproof coating to substantially maintain the moisture content of said cement at a constant level; and laminating a veneer layer on top of said base portion, said veneer layer having a combination of wood and vinyl to provide a thin layer having the appearance of wood and a vinyl surface facing up from said layer.

16. The method of claim 15 which includes cutting tongue and groove cuts along opposite parallel sides of said base to provide interlocking engagement with an adjacent tile.

17. The method of claim 16 wherein the end of said base under said tongue is tapered at an angle sufficient to provide a relief space at the engagement of a groove in an adjacent tile.

18. The method of claim 15, wherein said veneer layer comprises a vinyl impregnated porous wood.

19. The method of claim 15 wherein said veneer layer comprises a wood veneer having a vinyl laminate thereon in an amount sufficient to impregnate said wood veneer.

* * * * *